(12) United States Patent
Roth

(10) Patent No.: US 8,859,943 B2
(45) Date of Patent: Oct. 14, 2014

(54) METHOD FOR MAXIMIZING THE CONTRAST OF AN IMAGE

(75) Inventor: Ronald Roth, Solon, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 390 days.

(21) Appl. No.: 13/320,084

(22) PCT Filed: May 19, 2010

(86) PCT No.: PCT/US2010/035340
§ 371 (c)(1),
(2), (4) Date: Jan. 16, 2012

(87) PCT Pub. No.: WO2010/135385
PCT Pub. Date: Nov. 25, 2010

(65) Prior Publication Data
US 2012/0104226 A1    May 3, 2012

Related U.S. Application Data

(60) Provisional application No. 61/180,508, filed on May 22, 2009.

(51) Int. Cl.
*G01J 1/32* (2006.01)
*G06K 7/10* (2006.01)

(52) U.S. Cl.
CPC .... *G06K 7/10732* (2013.01); *G06K 2207/1018* (2013.01)
USPC ........................................................ 250/205

(58) Field of Classification Search
USPC ................ 250/205, 231.13–231.18; 235/455, 235/462.06
See application file for complete search history.

(56) References Cited

U.S. PATENT DOCUMENTS

| 5,302,944 | A  | * | 4/1994  | Curtis ........................... 340/653 |
| 5,514,864 | A  | * | 5/1996  | Mu-Tung et al. ............. 250/205 |
| 5,745,236 | A  |   | 4/1998  | Haga |
| 5,774,212 | A  |   | 6/1998  | Corby, Jr. |
| 6,515,745 | B2 |   | 2/2003  | Vurens et al. |
| 6,734,904 | B1 |   | 5/2004  | Boon et al. |
| 7,025,270 | B2 | * | 4/2006  | Tangezaka et al. ...... 235/462.06 |
| 7,205,549 | B2 |   | 4/2007  | Yoshida et al. |
| 2007/0253033 | A1 | | 11/2007 | Johansen et al. |
| 2008/0225286 | A1 | | 9/2008  | Shibata et al. |

* cited by examiner

*Primary Examiner* — Thanh Luu
(74) *Attorney, Agent, or Firm* — Robert J. Clark

(57) ABSTRACT

A method 100 maximizes the contrast between light and dark markings 13 that carry information. The markings are illuminated by a variable output light source 16, and a reflected image is received by a detector 18 and processed by a controller 20. The method calculates a histogram of the reflected image at step 102, and the method determines at step 104 if the histogram has one peak or two peaks. The method increases at step 110 or decreases at step 112 the output of the light source 16 by adding or subtracting a small step amount to or from the current light level of the light source 16. The method 100 is a continuously repeating loop, and the method increases or decreases the light level of the source of illumination with substantially every loop to oscillate about an equilibrium light level that provides maximum contrast.

16 Claims, 9 Drawing Sheets

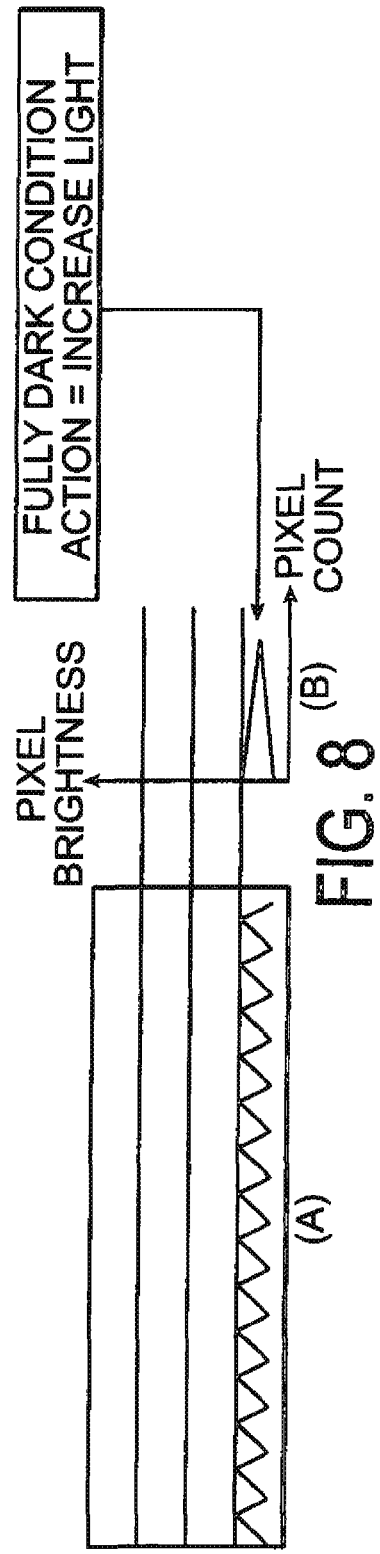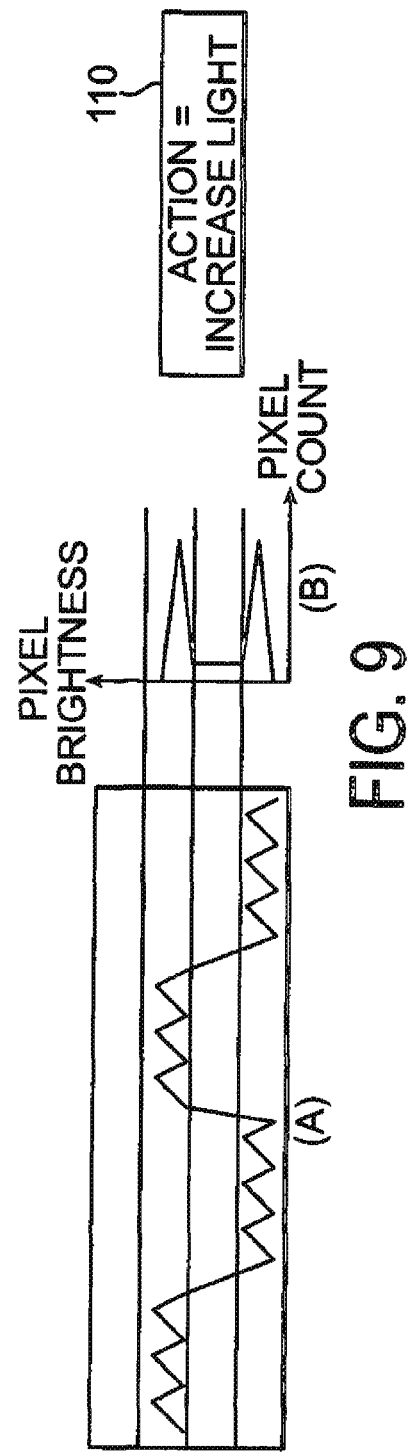

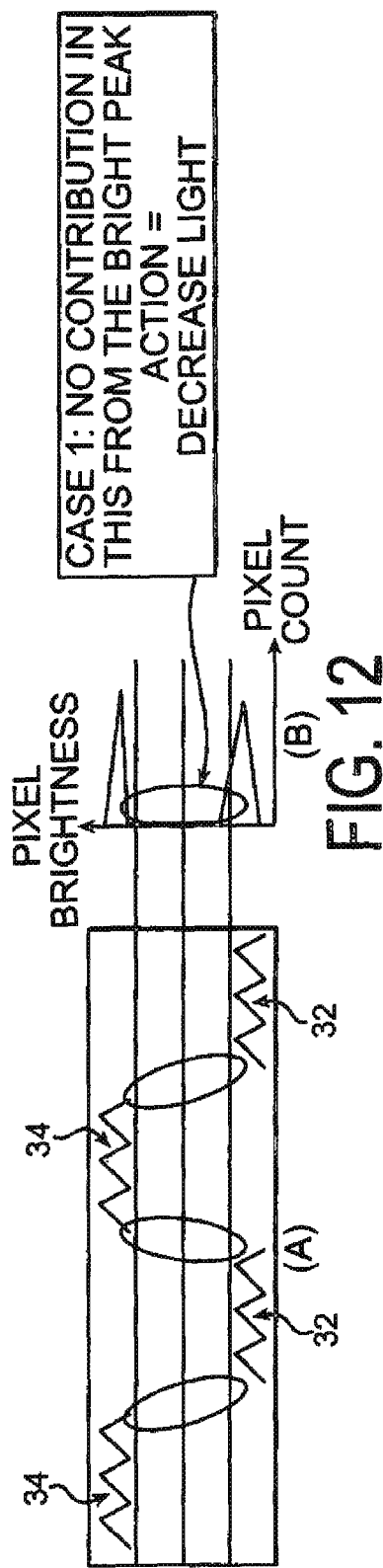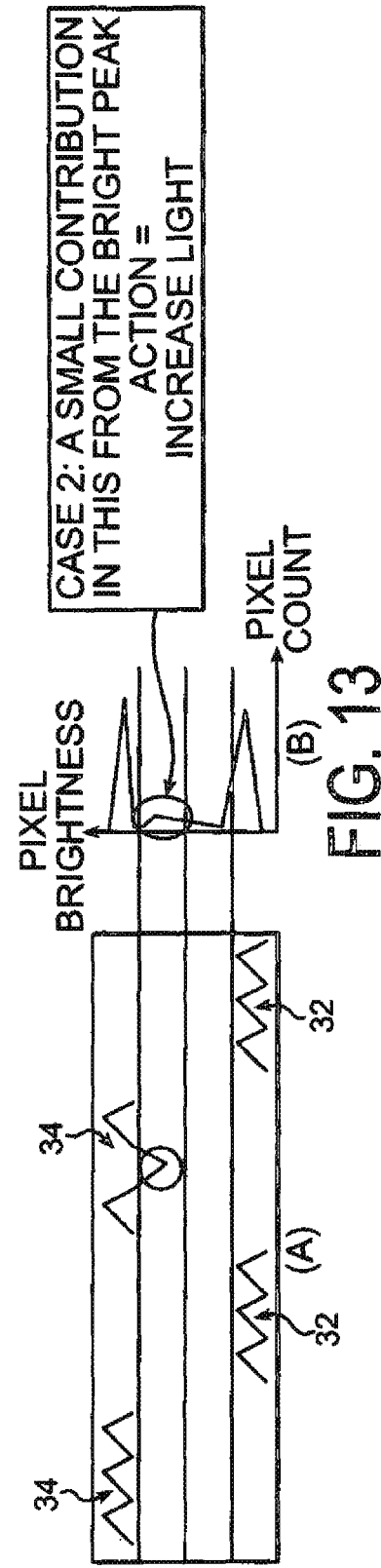

METHOD FOR MAXIMIZING THE CONTRAST OF AN IMAGE

CROSS REFERENCE TO RELATED APPLICATIONS

The present application is a national phase of International Application No. PCT/US2010/035340 filed May 19, 2010 which claims the benefit of the filing date of U.S. Provisional Application Ser. No. 61/180,508 filed May 22, 2009, the disclosure of which is incorporated herein by reference in its entirety.

TECHNICAL FIELD

This invention relates generally to a method for maximizing the contrast of a detected image in a closed loop energy system that includes an energy source and a detector. More specifically, this invention relates to such a method that varies the output of an energy radiation source such as a light source to maximize such contrast in such detected image.

BACKGROUND OF THE INVENTION

Closed loop energy systems may be used for emitting energy from a source of energy and for detecting data transmitted to a detector. The term "detect" with respect to energy systems, radiation, information, images and methods, as used herein means read or receive or gather energy directly or indirectly from the source in a form that can be used or processed.

Such systems may be radiation systems, in which energy travels through a medium or through space, to be received by another body (including a detector). The energy system may be ionizing or non-ionizing, and may be optical, in which the source of energy is a light source, or may include other energy sources such as may be used in radar or sonar or x-ray or other systems. Optical systems for detecting information that may be encoded are widely used in a variety of known applications, and the method according to this invention will be summarized and described primarily as used in such optical systems. However, the method according to this invention may be used in any other suitable energy system.

One such optical system is a bar code reader system. In this application, encoded information may be provided in indicia which may include a combination of light and dark markings or zones. The markings may be arranged in a bar like pattern that may be called a bar code. The pattern may be associated with nearly any type of object and may encode nearly any type of information. An energy source such as a light source may illuminate the bar code, and a detector may detect reflected light from the bar code to detect the pattern and its encoded information.

Another such optical system may be a position detecting system that detects the position of an object. A position detecting system that detects the position of an object such as a fluid cylinder is shown in U.S. Pat. No. 7,047,865. The cylinder illustrated in that patent includes a piston and a piston rod. Fluid pressure acts against the piston to create a force that causes motion of the piston and piston rod. Encoded information concerning the position of the piston rod may be provided in Indicia which may be a combination of light and dark markings associated with the piston rod. Known optical sensors may include a light source that illuminates the markings and a detector that detects reflected light from the markings. The optical system may determine the position of the piston rod based upon the detected markings and their encoded information.

SUMMARY OF THE INVENTION

This invention provides a method for increasing the contrast of detected information in an energy system, and particularly provides such a method for use in a closed loop energy radiation system.

The energy system may include a source of energy, such as a variable output source of illumination. The method according to this invention detects an image, such as an image of light and dark markings, and may increase or decrease the output of the source of energy to increase the contrast in such image.

The increase or decrease according to this method may be accomplished by adding or subtracting an energy level step amount to or from the current output level of the source of energy. The method may be performed in a continuously repeating loop, and the intensity of the energy source may be increased or decreased with substantially every loop or with N loops (where N is the number of loops).

At the beginning of every loop, a new image is detected and processed. According to the method of this invention, the processing of the new image determines if the intensity of the source of energy needs to be increased or decreased. When that determination is made and the source of energy so adjusted, a next new image is detected and processed. Over the course of a number of or numerous iterations and steady state conditions, the method may settle into an equilibrium which provides the maximum contrast in the reflected image.

To process each new image, the invention may also calculate a histogram from such image. This may be done by dividing the energy level of the image, such as by dividing the brightness level of the image, such as pixel brightness levels, into a predetermined number of groups or bins and counting the energy or brightness level (such as how many pixels are present) in each such bin. This represents the distribution of energy values in the image, so that peaks or the absence of peaks in the histogram may be identified. As used herein, the term "brightness level" includes the energy level in an optical, sonar, radar, x-ray or other energy system.

If only a single peak is identified in the histogram, the intensity of the energy source may be increased or decreased in response to the difference between the intensity represented by the peak and a known predetermined threshold. The known predetermined threshold in an optical system, for example, may be near the center of the image brightness scale, to prevent the method from getting stuck at a fully saturated condition with all pixels at maximum brightness because the intensity of the source of illumination is too high, or at a fully dark condition with all pixels at minimum brightness because the intensity of the source of illumination is too low. As used herein, the term "image brightness scale" means the range of allowable energy levels of the image in the system, between and including the minimum level and the maximum level. As used herein when the energy system is an optical system, the term "image pixel brightness scale" means the range of allowable light levels of the image in the optical system, between and including the minimum level and the maximum level. If two peaks are identified in the histogram, the brighter peak is considered according to the method of the present invention. If the brighter peak is not at its saturation level, the intensity of the energy source may be increased by the predetermined step amount from its current level without considering the second peak, to achieve maximum contrast.

If, however, the brighter peak is at its saturation level, then the darker peak is considered according to this method. In this step of the method, the contrast in the image is assured by requiring that the darker peak be, for example, one half (½) or less the brightness of the brighter peak. If the darker peak is greater than this predetermined threshold (for example, if the light level of the darker peak in an optical system is 90% of the light level of the brighter peak), the intensity of the light source may be decreased to achieve a greater contrast between the brighter and the darker peaks.

If the brighter peak is at its saturation level and the darker peak is below that predetermined threshold, any pixels in the edges between the peaks are removed from the histogram as a fine adjustment step for the method. If it is determined that the brighter peak is starting to become unsaturated the intensity of the source of illumination can be increased. On a subsequent loop, the intensity can be decreased if the brighter peak is not starting to become unsaturated. This step creates an oscillating equilibrium around an ideal energy source output level (light source output or illumination light level in an optical system).

The invention also provides various ones of the additional methods and features described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which:

FIG. 8 illustrates additional steps of the method illustrated in FIGS. 4 and 5 according to certain principles of this invention;

FIG. 9 illustrates additional steps of the method illustrated in FIGS. 4 and 5 according to certain principles of this invention;

FIG. 12 illustrates additional steps of the method illustrated in FIGS. 4 and 5 according to certain principles of this invention;

FIG. 13 illustrates additional steps of the method illustrated in FIGS. 4 and 5 according to certain principles of this invention;

DETAILED DESCRIPTION OF THE INVENTION

The principles, embodiments and operation of the present invention are illustrated in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
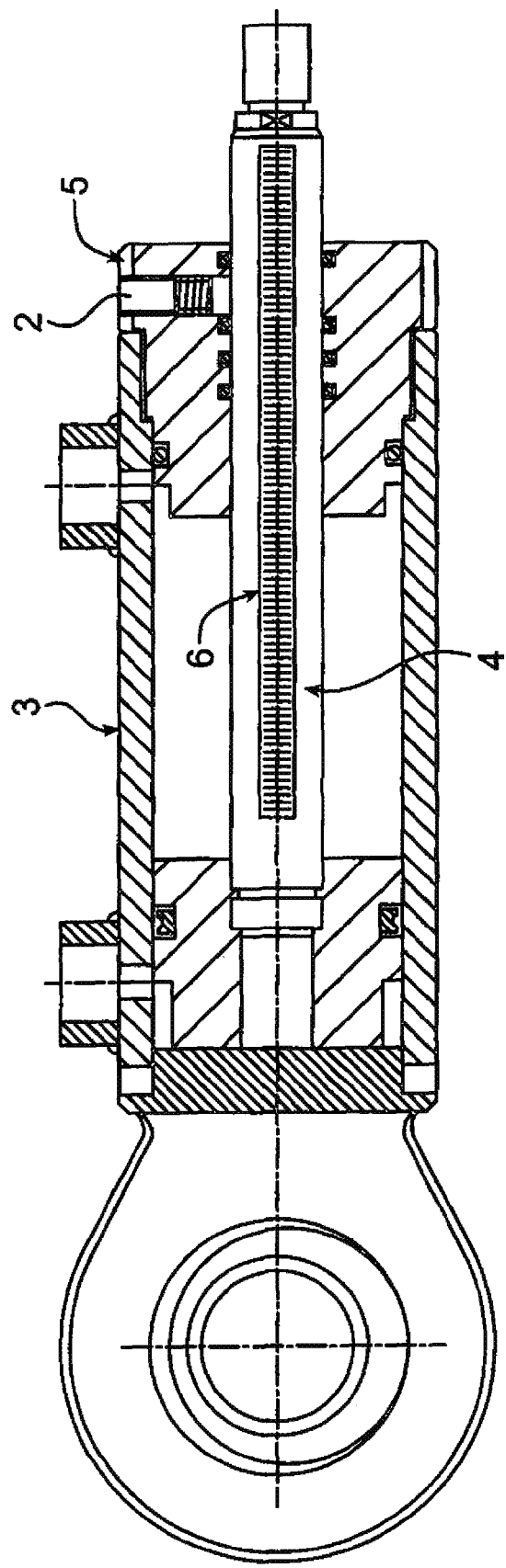
FIG. 1 is a cross sectional side elevation view of a prior art position detecting fluid cylinder, showing one application in which the method according to certain principles of this invention may be used.

FIG. 1 illustrates a known sensor 2. As described further below, the sensor 2 includes a variable output source of radiating energy and a detector for detecting any information or image resulting from or defined by reflected or transmitted energy from the energy source. In the preferred embodiment, the sensor 2 is an optical sensor associated with a known fluid cylinder 3 for detecting an image such as an image indicating a position of a rod 4 of the cylinder 3. The sensor 2 is affixed to a portion of a housing 5 of the cylinder 3. The rod 4 includes a predefined pattern of light and dark markings 6, a portion of which is shown in FIG. 1 extending under the sensor 2. The position of the rod 4 relative to the housing 5 is determined in a known manner based upon the portion of the predefined pattern 6 detected by the sensor 2. The position sensor 2 may preferably detect the current position of the rod 4 without reference to a previous position and operate as an absolute position sensor. Alternatively, the position sensor may reference a prior position and the amount of movement from the prior position to detect the current position and operate as a relative position sensor.

Known optical sensors such as the sensor 2 include a source of light energy for illuminating a portion of the pattern to be detected and a detector for detecting the light energy reflected off of the pattern. With known energy systems, and particularly with known optical systems, control of the energy provided by the energy source may not be provided or may not provide maximum contrast in the image. As a result, the contrast of the detected portion of the pattern may vary significantly over the useful life of the sensor 2. It is desirable to maximize the contrast of the detected portion of the pattern regardless of the condition of the markings.

Figure 2:
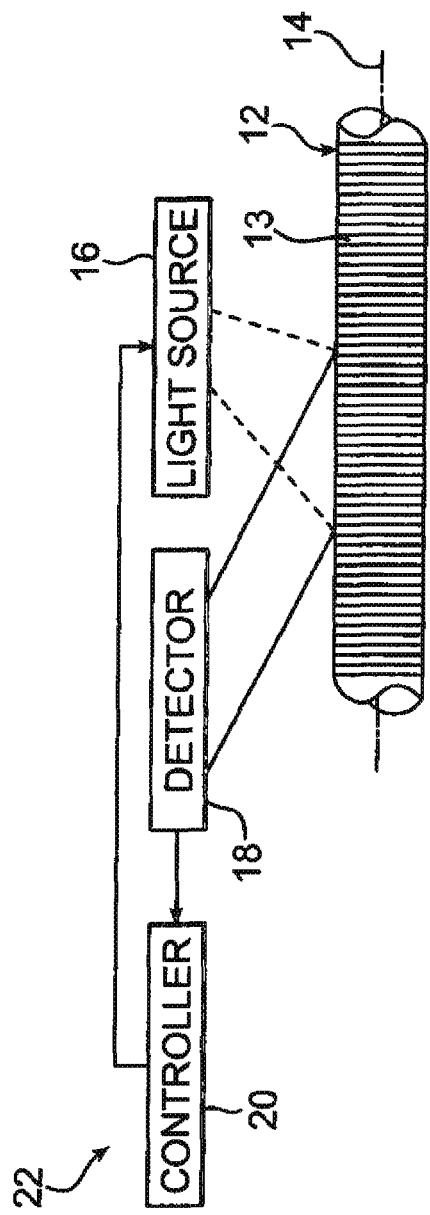
FIG. 2 illustrates a portion of a fluid cylinder of the general type shown in FIG. 1, modified to perform the method according to certain principles of this invention.

The present invention provides a method of maximizing the contrast of an image in an energy system by controlling the output of the source of energy in the system. In the presently preferred embodiment of the invention, the energy system is an optical system and the source of energy is a variable output light source. FIG. 2 illustrates a device 12 toward which the energy from the energy source radiates. In the preferred embodiment, the device 12 is a rod similar to that illustrated in FIG. 1 having indicia which is a known pattern of markings 13. The markings in FIG. 2 include dark markings and light markings. The markings can be of varying width, along the axis 14 of the rod 12, or may have the same width. The pattern is formed from a plurality of code words. Detection of one or more of the code words indicates a position of the rod 12. FIG. 2 also schematically illustrates a variable output energy source which is a light source 16 in the preferred embodiment, a detector 18 which is a light detector in the preferred embodiment, and a controller 20, all of which are part of an optical system 22. The light source 16 has a variable illumination or light level. For example, by controlling the power provided to the light source 16, the illumination of the light source can be increased, decreased, or maintained at a constant level. In one embodiment, the light source 16 is a light emitting diode (LED). The detector 18 is adapted to detect an image of the illuminated portion of the pattern. The detector 18 in one embodiment is a charge coupled device (CCD).

The controller 20 may be a microprocessor based controller or an application specific integrated circuit. The light source 16 and the detector 18 may also be part of the application specific integrated circuit. The controller 20 is operatively connected to the detector 18 and the light source 16 and is adapted to receive images from the detector 18, to perform the method discussed below, and to output control signals to the light source 16 for varying the light level provided by the light source.

Figure 3:
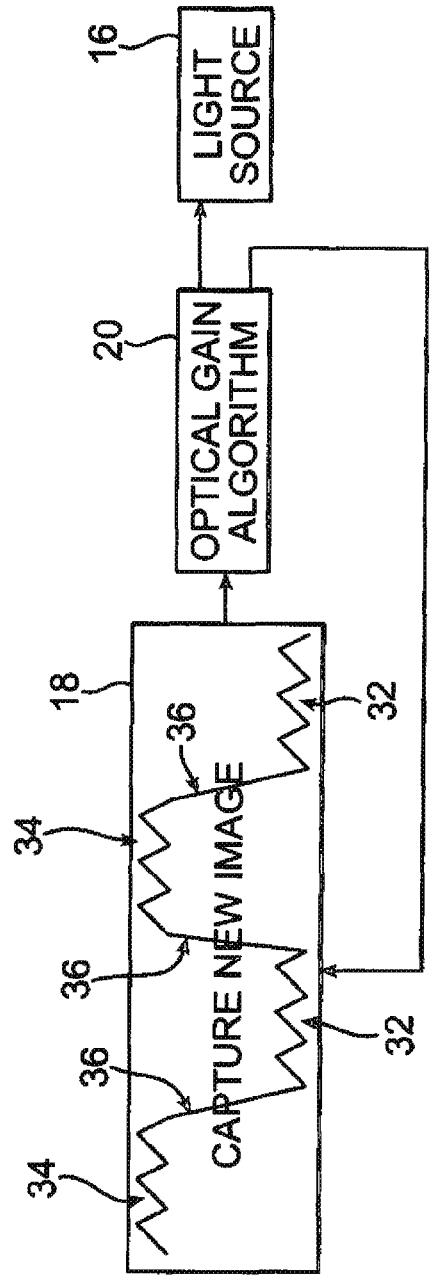
FIG. 3 illustrates a flow chart showing certain steps of the method according to certain principles of this invention.

With reference to FIG. 3, the image detected by the detector 18 is provided to and received by the controller 20. A portion of the detected image is illustrated in the detector 18 of FIG. 3. The image illustrated includes distinct portion indicating dark markings 32, distinct portion indicating light markings 34, and edges 36 between the dark markings and the light markings. The image illustrated in FIG. 3 has a high contrast between the dark markings 32 and the light markings 34. With reference to FIG. 2, the image detected by the detector 18 includes the entire illuminated area of the pattern, or alternatively a large portion of the illuminated area of the pattern. FIG. 2 schematically illustrates the illumination in the area between the dashed lines and the reflected light from the target 12 to the detector 18 in the area between the solid lines extending between the target 12 and the detector 18. As a result, the detected image includes a significant number of dark markings and light markings.

The controller 20 performs the method 100 illustrated with reference to FIGS. 4 and 5 (also called the Optical Gain Algorithm in the drawings) to adjust the illumination (or light level) in order to maximize contrast between the dark markings 32 and the light markings 34. The method 100 operates in a loop. At the beginning of each loop, a new image from the detector 18 is received. The method 100 is performed using the received image to determine whether the light level needs to be increased or decreased. As soon as a determination is made, the method 100 ends and, the controller 20 waits for the next image to be received. Over numerous iterations and steady-state conditions, the method 100 will settle about an oscillating equilibrium that provides the maximum contrast in the image. While the light intensity is updated at every occurrence of the loop in the preferred embodiment, it could alternatively be updated less frequently or more frequently if desired.

Figure 4:
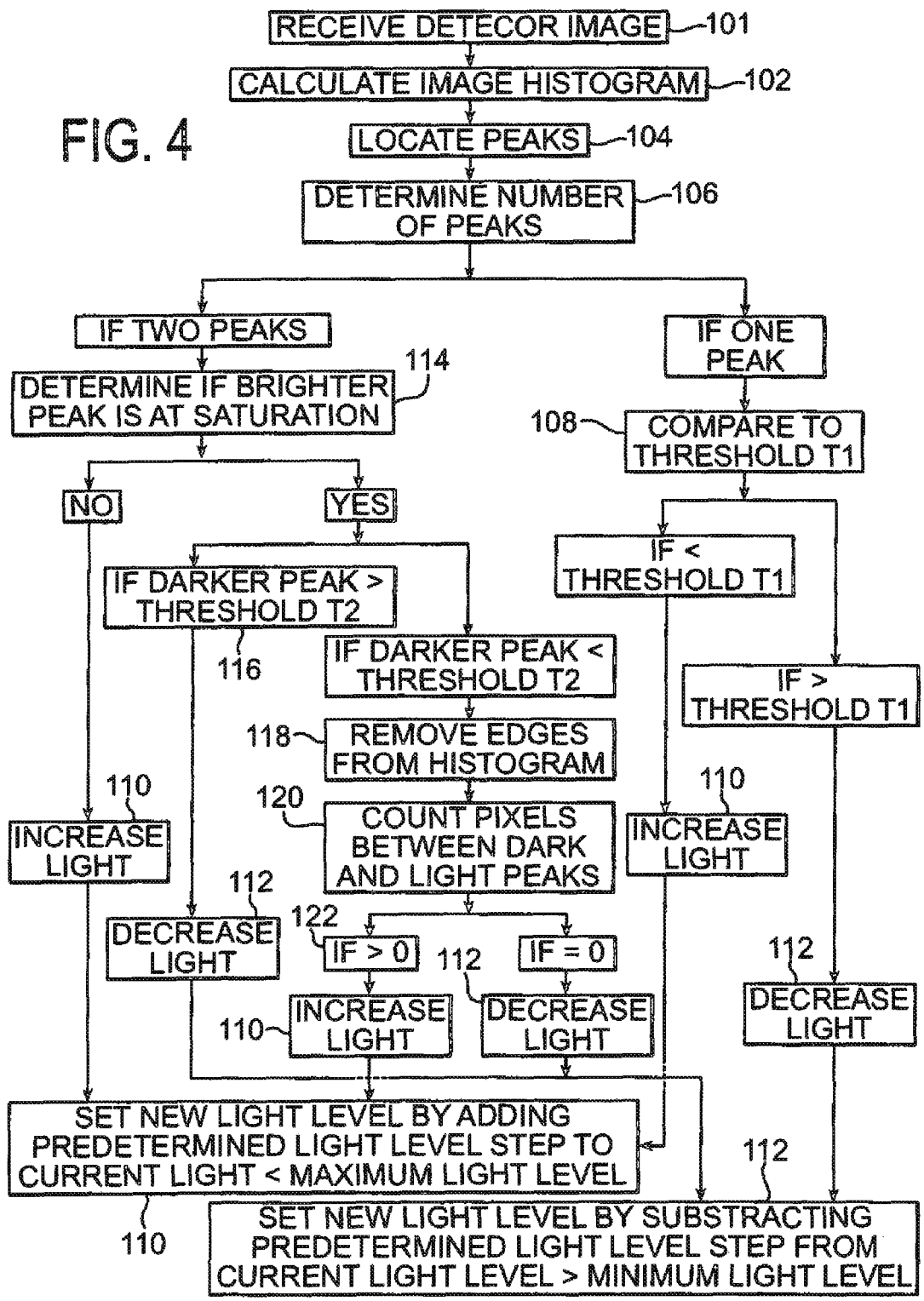
FIG. 4 illustrates a flow chart, more detailed than FIG. 3, showing additional steps of the method illustrated in FIG. 3 according to certain principles of this invention.
Figure 5:
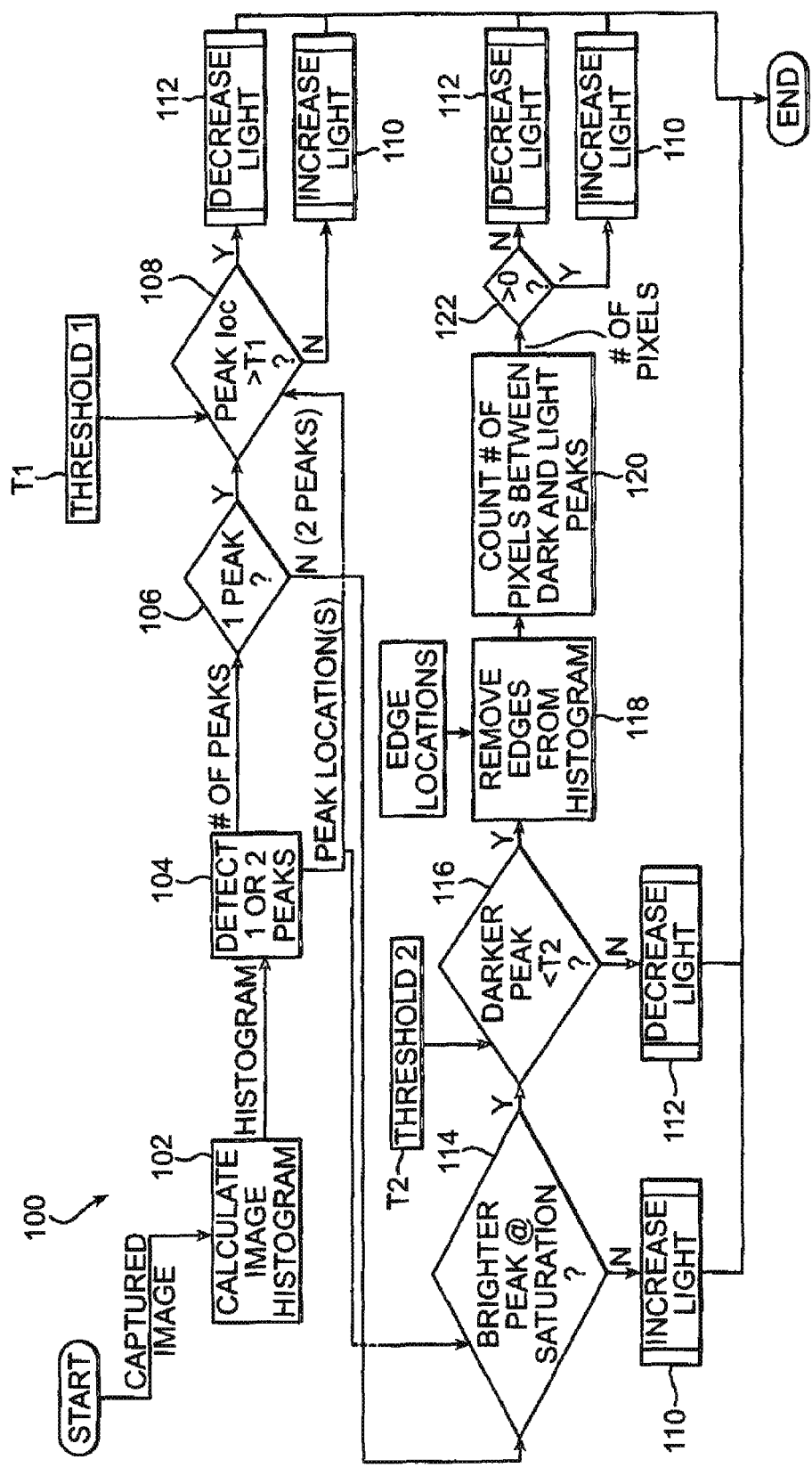
FIG. 5 illustrates a flow chart, showing additional steps of the method illustrated in FIG. 4 according to certain principles of this invention.
Figure 6:
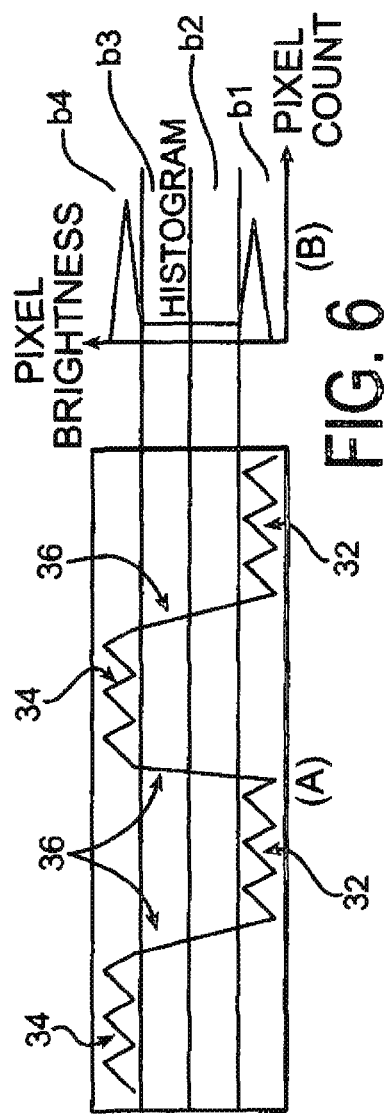
FIG. 6 illustrates additional steps of the method illustrated in FIGS. 4 and 5 according to certain principles of this invention.

Referring now to FIGS. 4 and 5, the controller 20 receives the detected image at step 101 of the method 100. After the image is received in the controller 20, the controller 20 calculates an image histogram at step 102. FIG. 6 illustrates the process of calculating the image histogram. This step involves dividing up the pixel brightness levels of the image into "bins" and counting the number of pixels present in each bin. FIG. 6(*a*) illustrates four bins b1, b2, b3, and b4 for the pixels of the detected image. In one embodiment of the invention, the brightness scale of the image has a wide range and the full scale of the pixel brightness for the detector 18 is separated into 32 evenly spaced bins. The histogram, shown in FIG. 6(*b*), indicates the number of pixels having a brightness that falls within the associated bin. Thus, bin b4 in FIG. 6(*b*) has more pixels than bin b3 due to more pixels in the image of FIG. 6(*a*) being located in bin b4 than in bin b3. The vertical axis of the histogram represents the distribution of brightness values in the image with bin b4 having a higher brightness value than bin b1. In the preferred embodiment with 32 bins, the highest bin corresponds to fully bright and the lowest bin corresponds to fully dark. The bins in the preferred embodiment are all of the same size and are evenly distributed, and alternatively the bins may be of different size and may be distributed unevenly. Specifically, the brightest bin may be larger than other bins, so that slightly lower image pixel brightness levels may be counted as saturated. Also, in alternative embodiments, any bin may be selected as the saturation bin and the method may tune the signal level to be as bright as the saturation bin or brighter.

Referring again to FIGS. 4 and 5, after the histogram is calculated, the method 100 proceeds to step 104 in which peaks in the histogram are detected. To detect the peaks in the histogram, the bin of the histogram having the highest pixel count is located. The controller 20 determines the "peak hill" associated with the bin having the highest pixel count by systematically reviewing the pixel count of each adjacent bin until an increase in the pixel count is discovered. For example, if a histogram has 32 bins and the bin having the highest pixel count is bin b32 with 32 pixels and subsequently adjacent bins have the values b31=28 pixels, b30=22 pixels, b29=14 pixels, b28=14 pixels, b27=16 pixels, then the controller 20 determines that the peak hill extends through bin b28 and does not include bin b27. After the peak hill is determined, the controller zeroes out all of the bins associated with the peak hill (e.g., b28-b32) and then repeats the process step to detect next peak (i.e., the bin having the next highest pixel count, after the zeroing out of the peak hill). The zeroing out the peak hill according to this method is a simple way of making sure that all of the pixels associated with that peak hill are ignored when detecting the second peak. This zeroing out occurs twice during the loop, once to detect the largest peak and again to detect the second largest peak. The peak hill determination takes place on both sides of the peak, except that this cannot be done when a peak is located at the histogram boundaries. For example, in the above described example in which the total number of bins is 32, the peak hill determination of course cannot be done in bins larger than 32.

At step 106, a determination is made as to whether the histogram of the image has one peak or two peaks. This distinguishes between the case in which there is little to no contrast versus the case in which there is some contrast. Ideally, as illustrated in FIG. 6(*b*), the histogram will have two peaks, one associated with the dark markings 32 and one associated with the light markings 34 of its associated image (see FIG. 6(*a*)).

If the histogram has only one peak (FIGS. 4 and 5), the method proceeds to step 108 in which the location of the bin having the highest pixel count (i.e., the peak of the peak hill) is compared to a predetermined arbitrarily determined threshold value T1 to determine if the light level is too bright or two dark. Threshold value T1, for example, may be indicative of a bin location in the middle of the detector's brightness scale. Alternatively, the threshold value T1 may be empirically or otherwise determined. The threshold value T1 is preferably not located at a boundary bin, and the threshold value T1 is determined so that there is enough room or dynamic range above and below the threshold for a second peak to form when the contrast is adjusted. Thus, there should be a minimum of three bins. When the light level in the bin location of the peak is less than the threshold value T1, the light level may be too low (too dark). Likewise, when the light level in the bin location of the peak is greater than the threshold value T1, the light level may be too bright (too light). In the unlikely event that precisely the same number of pixels were to exist in all bins indicating an image with zero contrast, the method would treat the situation as a single peak condition and a subsequent loop would provide a histogram with contrast that would have one or two peaks for the method to continue to maximize whatever contrast is then present in the image.

Figure 7:
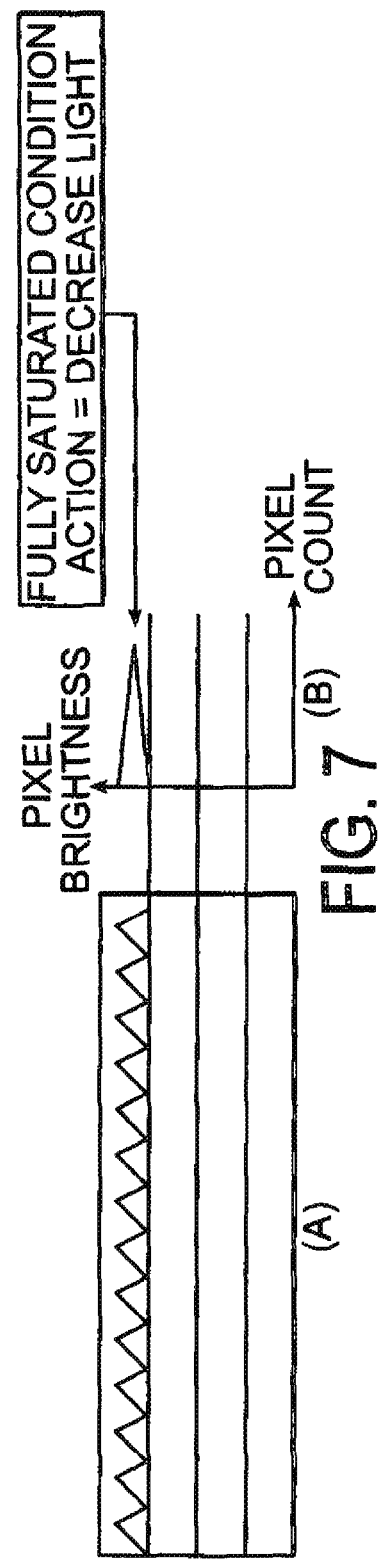
FIG. 7 illustrates additional steps of the method illustrated in FIGS. 4 and 5 according to certain principles of this invention.

Still referring to FIGS. 4 and 5, when the determination at step 108 indicates that the light level is too low (a negative determination as illustrated in FIG. 5), the method 100 proceeds to step 110 in which the light level is increased. When the determination at step 108 indicates that the illumination is too bright (an affirmative determination as illustrated in FIG. 5), the method 100 proceeds to step 112 in which the light is decreased. Step 110 is described below in detail with reference to FIG. 14, while step 112 is described below in detail with reference to FIG. 15. If there is only one peak, then the reflected light level is increased or decreased to move that peak to a location near the center of the brightness scale. This prevents the method 100 from "getting stuck" at a fully saturated condition (all reflected pixels are at maximum brightness because the light level of the source of illumination is turned too high) as shown in FIGS. 7(a) and 7(b) or at a fully dark condition (all pixels are at minimum brightness because light level is too low) as shown in FIGS. 8(a) and 8(b).

With continuing reference to FIGS. 4 and 5, when the determination at step 106 is that the histogram has more than one peak, the method 100 proceeds to step 114. At step 114, a determination is made as to whether the brightest peak is located in the bin having the highest value on the brightness scale i.e., located in the bin highest on the vertical axis of the illustrated histogram (near saturation). For example, with reference to FIG. 6(b), which is the previously discussed histogram associated with the detected image shown in FIG. 6(a) in which bin b4 is the location of the brightest peak, and also with reference to FIG. 10(b) in which the top most bin is the location of the brightest peak, the determination of step 114 would be affirmative. With reference to FIG. 9(b) in which the third bin from the bottom is the location of the brightest peak, which is a different histogram associated with a different detected image shown in FIG. 9(a) from a different loop of the method 100, the determination at step 114 would be negative. When the determination at step 114 is negative, the brightest peak is beginning to become unsaturated and the method 100 proceeds to step 110 and the light level is increased. When the determination at step 114 is affirmative, the brightest peak is beginning to become saturated and the method 100 proceeds to step 116.

Figure 10:
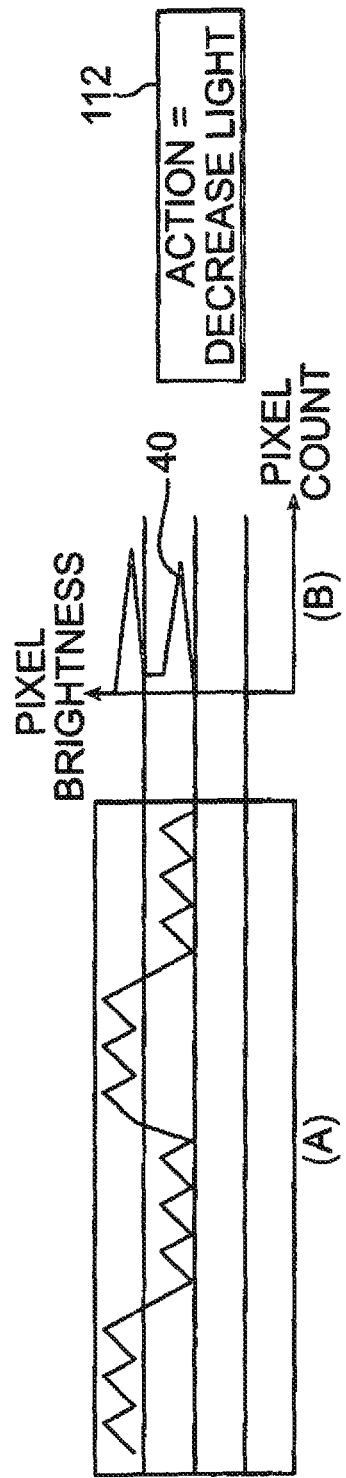
FIG. 10 illustrates additional steps of the method illustrated in FIGS. 4 and 5 according to certain principles of this invention.
Figure 11:
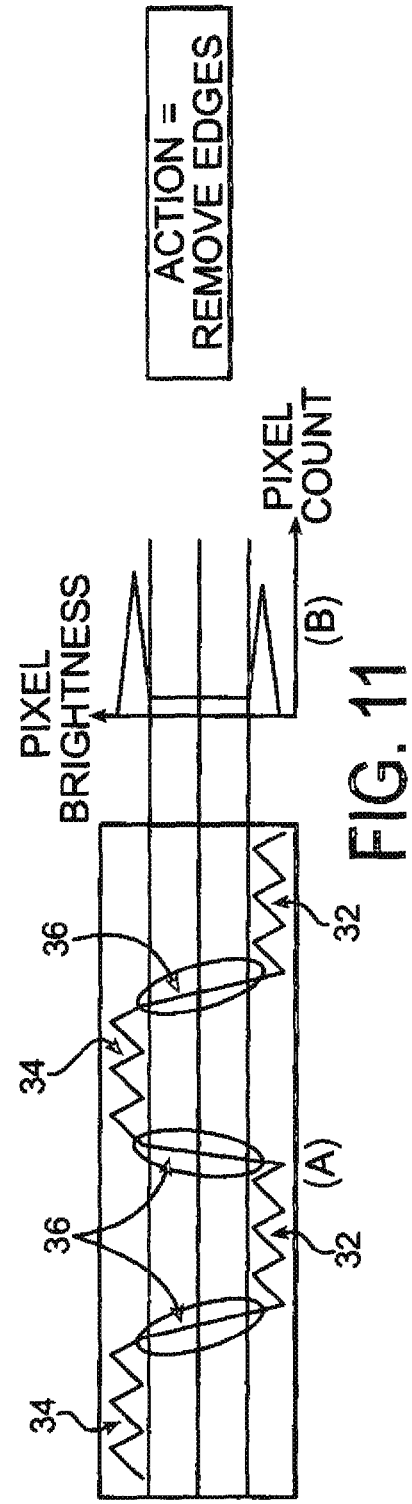
FIG. 11 illustrates additional steps of the method illustrated in FIGS. 4 and 5 according to certain principles of this invention.

At step 116, a determination is made as to whether the location of the second detected peak is less than a second predetermined threshold value T2. Threshold value T2, for example, may be indicative of a bin location in the middle of the detector's brightness scale. Alternatively, the threshold value T2 may be empirically determined. Threshold value T2 is independent of threshold value T1 and serves a different purpose. Threshold value T2 assures a certain minimum contrast before trusting that the edges to be removed are in fact real edges (rather than, for example, noise). If T2 isn't far enough below the full saturation bin, then some noisy excursions of the high or low signals could introduce phantom edges that are not real. With reference to FIG. 10(b), if the threshold value T2 is the middle of the brightness scale, the determination at step 116 with reference to peak 40 would be negative. In this case, T2 is in the bin below reference number 40 and the peak would have to be lower that in order to be below T2. When the location of the second detected peak is not less than the threshold value T2 (i.e., the determination is negative), the method 100 proceeds to step 112 and the light level is decreased. An affirmative determination at step 116 ensures well-separated peaks, i.e., high contrast. When the location of the second detected peak is less than the threshold value T2 (i.e., the determination at step 116 is affirmative), the method 100 proceeds to step 118. If two peaks exist but the contrast is less than, for example, two to one, the method will oscillate around the light level just below saturation, which will be the target condition of the method and which will optimize the relatively low contrast on the target itself. In this manner, the method will achieve optimum contrast even when the contrast presented is less than that required by T2.

Referring now to FIGS. 4, 5 and 11-14, at step 118, the pixels associated with the edges 36 are removed from the histogram. The edges 36 are determined by analyzing the image to determine the transitions between the dark markings 32 and the light markings 34. Note that prior to reaching step 118, the contrast is already at a somewhat high level with the brightest peak located in the brightest bin and the second peak below the threshold T2. FIG. 11(a) illustrates the edges 36 of the image located in ovals. The effect of these edges 36 in the histogram can be seen in FIG. 11(b). FIG. 12(a) illustrates the effect of removing the edges 36 from the image. After the edges 36 are removed from the image, the number of pixels located between the peaks in the resulting histogram is counted at step 120. FIG. 12(b) illustrates the histogram resulting from the image of FIG. 11(a) with edges 36 removed. FIG. 12(b) shows zero pixels located between the peaks. FIG. 13(b) illustrates the histogram resulting from the image of FIG. 13(a), with edges removed. FIG. 13(b) shows the presence of pixels between the peaks, with the chrome straggler pixel circled in the FIG. 13(b) histogram. If the number of counted pixels between the peaks is greater than zero, then the determination at step 122 is affirmative and the light level is increased in step 110. The presence of pixels between the peaks is indicative of the brightest peak beginning to become unsaturated (i.e., to move into a lower brightness bin in the histogram). If the number of counted pixels equals zero, then the determination at step 122 is negative and the light level is decreased at step 112. Accordingly, the method of the present invention removes the effect of the edges and determines if any pixels are located between the peaks of the histogram, and concludes that the brightest peak is beginning to become unsaturated when pixels are located between the peaks of the histogram.

Figure 14:
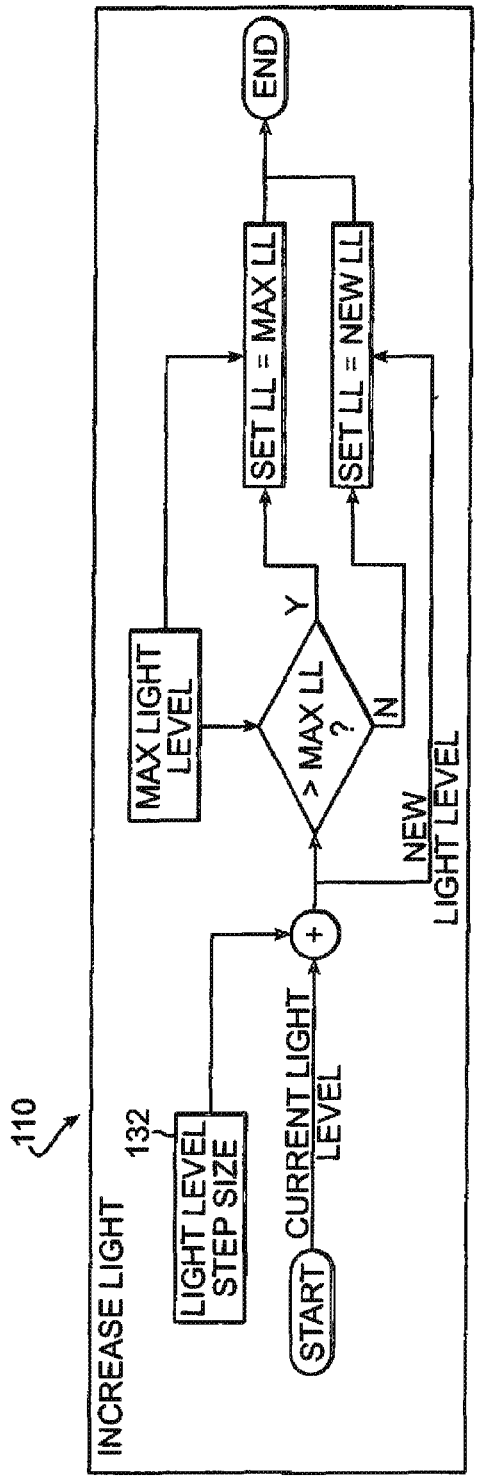
FIG. 14 illustrates additional steps of the method illustrated in FIGS. 4 and 5 according to certain principles of this invention.

Increasing the light level (i.e., step 110) will now be described with reference to FIG. 14. To increase the light level, a light level step size is added to the existing light level. The light level step size is a predetermine size adjustment of the light source. Thus, instead of the method making one large adjustment to the illumination of the light source, the method 100 makes multiple step size adjustments, one associated with each captured image. The size of the step that is selected may be dependent upon the specific energy system in which the method is utilized, and in the optical system of the preferred embodiment there are 256 steps all of the same size over the range of light levels from fully dark to fully saturated. Alternatively, there could be more steps or fewer steps, and the steps could be of variable size or could be determined by an algorithm. Thus, a large adjustment of the illumination results from multiple loops through the method 100. After adding the light level step size to the existing light level, the new light level is compared to the maximum light level. If the new light level is greater than the maximum light level, then the controller 20 outputs a signal to the light source 16 to set the light level at the maximum light level. If the new light level is less than the maximum light level, then the controller 20 outputs a signal to the light source 16 to set the light level, to the new light level.

Figure 15:
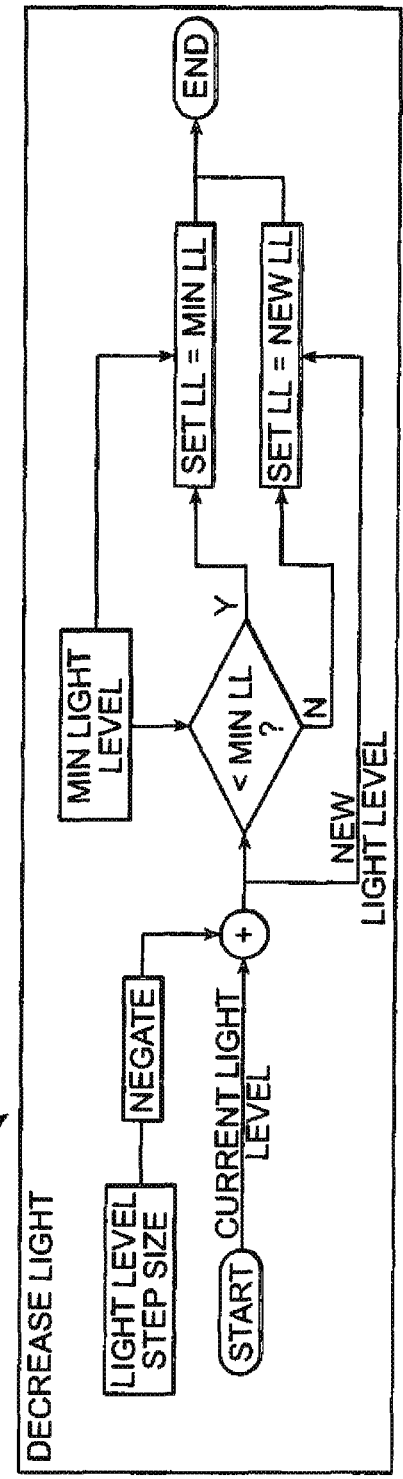
FIG. 15 illustrates additional steps of the method illustrated in FIGS. 4 and 5 according to certain principles of this invention.

Decreasing the light level (i.e., step 112) will now be described with reference to FIG. 15. To decrease the light level, a light level step size is subtracted from the existing light level of the light source 16 (or a negative of the step size is added to the existing light level). After subtracting the light level step size from the existing light level, the new light level is compared to the minimum light level. If the new light level is less than the minimum light level, then the controller 20 outputs a signal to the light source 16 to set the light level at the minimum light level. If the new light level is greater than the minimum light level, then the controller 20 outputs a signal to the light source 16 to set the light level at the new light level. After the light level is either increased or decreased, the current iteration of the method ends.

The method according to the present invention may increase or maximize the contrast in a detected image even as conditions may change over time, in a manner that may not be achieved with other methods. For example, in an optical system, if a constant light level from the source of illumination is used, there may be no adaptability and no opportunity to detect potential problems with the image. Also, the contrast may not be maximized and a useful image or signal may not be available if the light level is too high or too low. Alternatively, if the light level of the source of illumination is tuned such that the brightest N pixels are saturated, some of the bright pixels may be un-saturated, leading to potentially less than maximum brightness, since one bright pixel may be brighter or darker than other bright pixels. Still another alternative may be to tune the light level of the source of illumination so the average brightness value of the reflected image is near the middle of the brightness range. This alternative may not always produce maximum contrast, unless the same number of light and dark pixels exist in the image.

The method 100 of the present invention adjusts the light level of the light source 16 in response to each received image detected on each loop. The light level is adjusted in step sizes with a goal of settling about an equilibrium that provides the maximum contrast in the image. When used in an optical sensor 22 for determining a position of a member such as a rod 12 relative to another member such as a fluid or electric cylinder or other application that may sometimes provide less than entirely clean conditions, the adjustment of the light level helps to maintain a high level of contrast over various portions of the pattern that may have imperfections or other damage, varying wear conditions, or the presence of contamination.

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below.

What is claimed is:

1. A method for maximizing contrast in an optical system adapted for detecting a pattern formed from a plurality of dark and light markings and having a light source with a variable light level, the method comprising:
   illuminating a portion of the pattern with light from the light source at an existing light level;
   gathering an image of the illuminated portion of the pattern;
   calculating a histogram from the image;
   identifying at least one peak in the calculated histogram;
   determining whether a brightest peak is near saturation; and
   increasing the light level from the light source when the brightest peak is not near saturation.

2. The method of claim 1 further including, when the brightest peak is near saturation, decreasing the light level when no other peak is identified in the histogram.

3. The method of claim 1 further including, when the brightest peak is near saturation and a second peak is identified in the histogram, comparing a brightness of the second peak to a predetermined threshold and, when the brightness of the second peak is not less than the predetermined threshold, decreasing the light level.

4. The method of claim 3 further including, when the brightness of the second peak is less than the predetermined threshold, determining whether the brightest peak is beginning to become unsaturated and, when the brightest peak is beginning to become unsaturated, increasing the light level.

5. The method of claim 4 wherein determining whether the brightest peak is beginning to become unsaturated includes removing the effects of the edges from the histogram and, after removing the effects of the edges, determining if any pixels are located between the peaks of the histogram, and concluding that the brightest peak is beginning to become unsaturated when pixels are located between the peaks of the histogram.

6. The method of claim 3 further including, when the brightness of the second peak is less than the predetermined threshold, determining whether the brightest peak is beginning to become unsaturated and, when the brightest peak is not beginning to become unsaturated, decreasing the light level.

7. The method of claim 6 wherein determining whether the brightest peak is not beginning to become unsaturated includes removing effects of edges from the histogram and, after removing the effects of the edges, determining if any pixels are located between the peaks of the histogram, and concluding that the brightest peak is not beginning to become unsaturated when zero pixels are located between the peaks of the histogram.

8. The method of claim 1 wherein increasing the light level includes establishing a new light level by adding a predetermined light level step size to the existing light level.

9. The method of claim 8 wherein increasing the light level includes comparing the new light level with the maximum light level for the light source and, when the new light level exceeds the maximum light level, setting the light level at the maximum light level.

10. The method of claim 1 wherein decreasing the light level includes establishing a new light level by subtracting a predetermined light level step size from the existing light level.

11. The method of claim 8 wherein decreasing the light level includes comparing the new light level with the minimum light level for the light source and, when the new light level is less than the maximum light level, setting the light level at the minimum light level.

12. A method for increasing or decreasing a current radiated energy output level of a variable radiated energy output level energy source in an energy system that is transmitting at least a portion of the energy output to from an object with lighter and darker zones and from the object to a detector, comprising the steps of:
   detecting at least a portion of the transmitted energy from the object;
   identifying two peaks in the transmitted detected energy;
   determining if the brighter peak is near the saturation level;

and setting a new energy output level for the energy source by adding or subtracting an energy level step amount to the current energy output level of the energy source, the decision to add or to subtract being determined by the energy level of the darker peak when the brighter peak is near the saturation level.

13. The method of claim 12 wherein the energy source has a maximum energy output level, and the predetermined energy level step amount is less than the maximum energy output level.

14. The method of claim 13 wherein the method is a continuously repeating loop, and the energy level of the energy source is increased or decreased after N loops.

15. The method of claim 12 including the step of calculating a histogram based upon the detected energy.

16. The method of claim 15 including the step of removing the edges from the histogram.

* * * * *